United States Patent
Sakai et al.

(10) Patent No.: US 8,842,890 B2
(45) Date of Patent: Sep. 23, 2014

(54) METHOD AND DEVICE FOR DETECTING A GESTURE FROM A USER AND FOR PERFORMING DESIRED PROCESSING IN ACCORDANCE WITH THE DETECTED GESTURE

(75) Inventors: Yusuke Sakai, Kanagawa (JP); Shingo Tsurumi, Saitama (JP); Kazuya Katsuki, Tokyo (JP); Masao Kondo, Tokyo (JP)

(73) Assignee: Sony Corporation (JP)

( * ) Notice: Subject to any disclaimer, the term of this patent is extended or adjusted under 35 U.S.C. 154(b) by 400 days.

(21) Appl. No.: 13/217,458

(22) Filed: Aug. 25, 2011

(65) Prior Publication Data

US 2012/0057746 A1 Mar. 8, 2012

(30) Foreign Application Priority Data

Sep. 7, 2010 (JP) ................. P2010-199640

(51) Int. Cl.
*G06K 9/00* (2006.01)
*G06K 9/32* (2006.01)

(52) U.S. Cl.
CPC ........ *G06K 9/00355* (2013.01); *G06K 2209/27* (2013.01); *G06K 9/3216* (2013.01)
USPC ....................................................... 382/118

(58) Field of Classification Search
None
See application file for complete search history.

(56) References Cited

U.S. PATENT DOCUMENTS

| 2001/0042114 A1 | 11/2001 | Agraharam et al. |
| 2005/0084141 A1 | 4/2005 | Kato et al. |
| 2005/0238217 A1* | 10/2005 | Enomoto et al. ............ 382/128 |
| 2008/0019589 A1 | 1/2008 | Yoon et al. |
| 2011/0273551 A1* | 11/2011 | Yang et al. .................. 348/77 |

FOREIGN PATENT DOCUMENTS

| JP | 2002116859 A | 4/2002 |
| JP | 2004302992 A | 10/2004 |
| JP | 2005-031799 A | 2/2005 |
| JP | 2006133937 A | 5/2006 |
| JP | 2006262168 A | 9/2006 |
| JP | 2008015942 A | 1/2008 |
| JP | 2008516322 A | 5/2008 |
| JP | 2008269174 A | 11/2008 |
| JP | 2009087095 A | 4/2009 |
| JP | 2009151424 A | 7/2009 |
| JP | 2010015553 A | 1/2010 |
| JP | 2010246809 A | 11/2010 |
| JP | 2010534895 A | 11/2010 |

(Continued)

OTHER PUBLICATIONS

Office Action from Japanese Application No. 2010-199640, dated Jan. 28, 2014.

(Continued)

*Primary Examiner* — Brian P Werner
(74) *Attorney, Agent, or Firm* — Lerner, David, Littenberg, Krumholz & Mentlik, LLP

(57) ABSTRACT

A processing device and method are provided. According to illustrative embodiments, the device and method are implemented by detecting a face region of an image, setting at least one action region according to the position of the face region, processing image data corresponding to the at least one action region to determine whether or not a predetermined action has been performed, and performing processing corresponding to the predetermined action when it is determined that the predetermined action has been performed.

17 Claims, 9 Drawing Sheets

(56) References Cited

FOREIGN PATENT DOCUMENTS

| | | |
|---|---|---|
| JP | 2011166409 A | 8/2011 |
| JP | 2011186892 A | 9/2011 |
| JP | 2012068854 A | 4/2012 |
| JP | 2012516497 A | 7/2012 |
| WO | 2009018161 A1 | 2/2009 |
| WO | 2010087796 A1 | 8/2010 |

OTHER PUBLICATIONS

Communication from EP Application No. 11179064.8, dated Apr. 15, 2014.

* cited by examiner

METHOD AND DEVICE FOR DETECTING A GESTURE FROM A USER AND FOR PERFORMING DESIRED PROCESSING IN ACCORDANCE WITH THE DETECTED GESTURE

CROSS-REFERENCE TO RELATED APPLICATION

The present application claims priority from Japanese Patent Application No. JP 2010-199640 filed in the Japanese Patent Office on Sep. 7, 2010, the entire content of which is incorporated herein by reference.

BACKGROUND

The present disclosure relates to an information processing device and an information processing method.

In recent years, functions of devices such as electronic devices and so forth have become more sophisticated as well as increasing in number, and the instructions which the user has to give to the device to user the device are becoming more varied and complex. As such, many devices employ GUI (Graphical User Interface) as the user interface, whereby instructions can be given to the device more easily than in a case of using a device employing CUI (Character User Interface).

However, for users who are not accustomed to using a pointing device such as a mouse for example, a GUI is not necessarily an interface with good operability. Accordingly, there is demand for a user interface by which users can give instructions to devices more intuitively. This has led to user interfaces being developed to improve user operability. Japanese Unexamined Patent Application Publication No. 2005-31799 is one example of a technique for detecting shapes and actions of part of the body of a user or objects operated by the user, and performing processing according to the detected results.

An information processing device to which related art relating to a user interface for improving operability (hereinafter referred to simply as "related art") has been applied (hereinafter referred to as "information processing device according to the related art") detects gesture actions of the user using the arms, palms, fingers, and so forth, in a space, by performing image processing of imaged images (moving images, hereinafter referred to as "imaged images"). In the event that gesture actions of the user have been detected, the information processing device according to the related art performs processing corresponding to the detected gesture actions of the user. Accordingly, the user of a information processing device according to the related art can provide instructions to the information processing device according to the related art in a more intuitive manner than a case of using a GUI, and accordingly, user operability might be improved using the related art.

However, with the related art, shapes and actions of at least a part of the body of the user on the space, such as arms, palms, fingers or the like, or objects operated by the user, are detected to detect the gesture actions of the user, so image processing has to be performed on the entire imaged image. Accordingly, the more type of gesture actions there are to detect, and the more complex the gesture actions are, the higher the processing capability demanded of the information processing device according to the related art performing image processing is. Now, even though the processing capabilities of information processing devices such as PCs (Personal Computer) and so forth have improved in recent years along with higher functionality, diverting a great amount of calculating resources to the user interface might result in insufficient calculating resources for realizing other functions such as functions for controlling communication, for example. Also, in the event of a case where calculating resources for realizing other functions has become insufficient, processing relating to this function is not performed until the insufficiency of calculating resources is resolved, so with information processing device according to the related arts, an undesirable situation can occur in which the user is made to wait for an unreasonable amount of time, or the function is not realized.

Accordingly, with the case of using the related art, improvement in user operability is not improved without fail, since user convenience may be scarified.

SUMMARY

It has been found desirable to provide a new and improved information processing device and information processing method whereby user operability can be improved.

In view of the above, the present embodiments are provided. According to illustrative embodiments, a device and method are implemented by detecting a face region of an image, setting at least one action region according to the position of the face region, processing image data corresponding to the at least one action region to determine whether or not a predetermined action has been performed, and performing processing corresponding to the predetermined action when it is determined that the predetermined action has been performed.

DETAILED DESCRIPTION OF EMBODIMENTS

Figure 1:
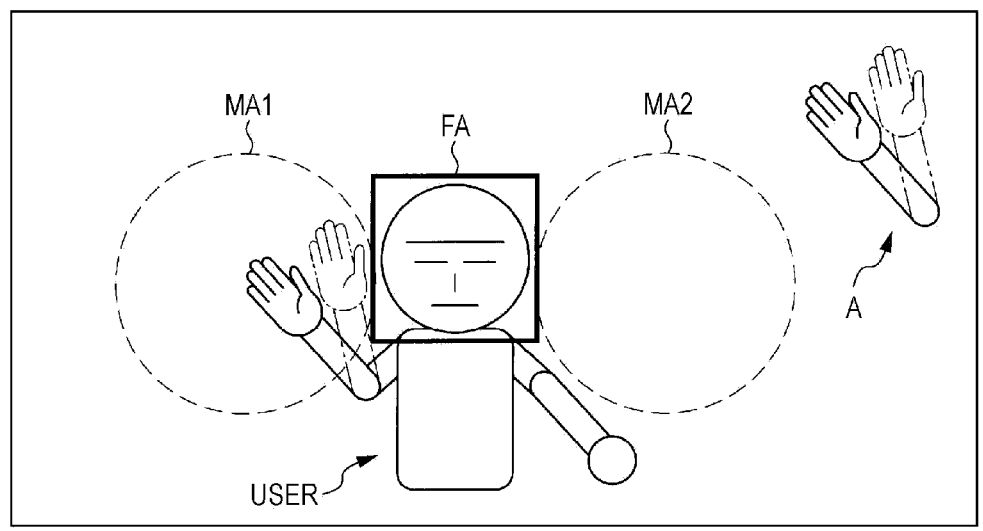
FIG. 1 is an explanatory diagram illustrating an example of action regions which an information processing device according to an embodiment of the present disclosure sets.

Preferred embodiments of the present disclosure will be described with reference to the appended drawings. Note that in the present Specification and drawings, components having substantially same functional configurations will be denoted with the same reference numeral, so as to omit redundant description.

Also, description will be made below according to the following order.

1. Approaches According to Embodiment of Present Disclosure

2. Information Processing Device According to Embodiment of Present Disclosure

3. Program According to Embodiment of Present Disclosure

1. Approaches According to Embodiment of Present Disclosure

Before describing the configuration of an information processing device according to an embodiment of the present disclosure (hereinafter, may be referred to as "information processing device 100"), operability improvement approaches according to an embodiment of the present disclosure will be described. In the following, description will be made by way of a primary example of a configuration wherein an imaged image that has been imaged at an external device of the information processing device 100 is input to the information processing device 100, and the information processing device 100 processes the imaged image. Note that the configuration of the information processing device 100 according to an embodiment of the present disclosure is not restricted to the above, and an arrangement may be made wherein, for example, the information processing device 100 has imaging functions, and the imaged image that has been imaged using the imaging functions is processed. Also, an imaged image according to an embodiment of the present disclosure is a moving image obtained by imaging (group of still images imaged consecutively on a time axis). Also, processing relating to operability improvement approaches according to an embodiment of the present disclosure described below can be understood to be processing relating to an information processing method according to an embodiment of the present disclosure.

Overview of Operability Improvement Approaches

As described above, in a case of detecting user gesture actions (hereinafter referred to simply as "action") and performing processing corresponding to the detected actions, the user can give instructions to the information processing device more intuitively than with a case of using a GUI. Accordingly, the information processing device 100 detects user actions by performing image processing of imaged images, and performing processing corresponding to the detected actions, thereby improving user operations.

Now, in the case of performing image processing as to an entire imaged image as with a information processing device according to the related art, high processing capabilities are a prerequisite to perform image processing. Thus, diverting a great amount of calculating resources to the user interface might as with information processing device according to the related arts may result in insufficient calculating resources for realizing other functions. Also, in the event of a case where calculating resources for realizing other functions has become insufficient, an undesirable situation can occur in which the user is made to wait for an unreasonable amount of time, or the function is not realized.

Accordingly, with the information processing device 100 a region including the face of the user (hereinafter referred to as "face region") is detected from the imaged image, and action region in the imaged image for detecting user actions are set nearby the face region identified by detection (hereinafter may be referred to as "identified face region"). The information processing device 100 detects predetermined actions of the user in the set action regions, and performs processing as to predetermined actions that have been detected. Now, predetermined user actions according to an embodiment of the present disclosure are user actions which are the object of determination, in which determination is made at the information processing device 100 regarding whether or not an action has been performed. The information processing device 100 performs the above determination based on, for example, an imaged image, and later-described reference detection information or individual determination information.

By setting action regions as described above, the information processing device 100 can detect user actions by performing image processing on a region which is a part of the imaged image, rather than performing image processing on the entire imaged image as with information processing device according to the related arts. Now, with the information processing device 100, the calculation load can be markedly reduced relating to the user interface as compared to information processing device according to the related arts, so there is no concern of insufficient calculation resources for realizing other functions as with information processing device according to the related arts. Also, the information processing device 100 identifies the face region from imaged images by performing face recognition processing, which is relatively light processing implemented in devices which do not have processing capabilities very high, such as digital cameras of cellular phones for example, and sets action regions nearby the face region, so the calculation load at the time of setting action regions is not great, either. Accordingly, the information processing device 100 can prevent occurrence of undesirable situations which can happen with information processing device according to the related arts as described above, so user convenience is not sacrificed as with information processing device according to the related arts.

Accordingly, the information processing device 100 can improve user operability.

Also, the information processing device 100 performs processing corresponding to predetermined actions detected in the action regions sent nearby the face region, so erroneous detection of predetermined actions due to actions performed by people or objects other than the user corresponding to the face region for example, can be reduced as compared to information processing device according to the related arts which take the entire imaged image and the object of processing. Accordingly, the information processing device 100 can further improve user operability as compared to information processing device according to the related arts.

Moreover, the information processing device 100 performs processing correlated to the meaning of the predetermined action, as processing corresponding to the predetermined action detected in the action regions set nearby the face region. For example, in the event of having detected an action where the user reciprocally moves a hand sideways nearby the face (generally, an action meaning "good-bye" or "bye-bye", hereinafter may be referred to as "bye-bye action") as the predetermined action, the information processing device 100 performs processing correlated to the meaning of the detected action, such as processing of turning off electric power to a device to be controlled (information processing device or external device), muting audio (including music) output from the device, or the like, for example. Also, in the event of having detected an action where the user reciprocally moves a hand vertically in the action region as the predetermined action, the information processing device 100 performs processing correlated to the meaning of the detected action, such as raising the volume of the audio output from a device to be controlled, or the like, for example.

As described above, by the information processing device 100 performing processing correlated to the meaning of detected action (processing taking affordance into consideration), the chance that the user will sense inconsistency between the user's own actions and the processing which the information processing device 100 performs (or processing which the information processing device 100 causes an external device to perform) can be further reduced. Accordingly, the information processing device 100 can further improve user operability.

The information processing device 100 improves user operability by performing the following processing, for example. More specifically, the information processing device 100 performs the following processing of (1) through processing of (4), thereby improving user operability.

(1) Face Region Detection Processing

The information processing device 100 detects the face of the user (subject) from the imaged image, and identifies a face region. Now, identifying the face region can be performed by detecting feature points of, for example, the user's eyes, nose, mouth, structure, and so forth, and detecting facial brightness distribution and regions similar to a structural pattern. Note that the face region detection processing at the information processing device 100 according to an embodiment of the present disclosure is not restricted to the above. For example, the information processing device 100 can detect the difference between a current frame to be processed and one frame back to detect a moving body, and detect the face region by identifying the head from the moving body.

Also, data relating to identification of the face region at the information processing device 100, such as data of face brightness distribution and structure pattern and so forth, is stored in a storage unit (later described) which the information processing device 100 has. Note that the information processing device 100 can perform communication with an external device such as a server via a communication unit (later described) which the information processing device 100 has for example, and obtain data relating to identification of a face region from the external device.

Figure 3:
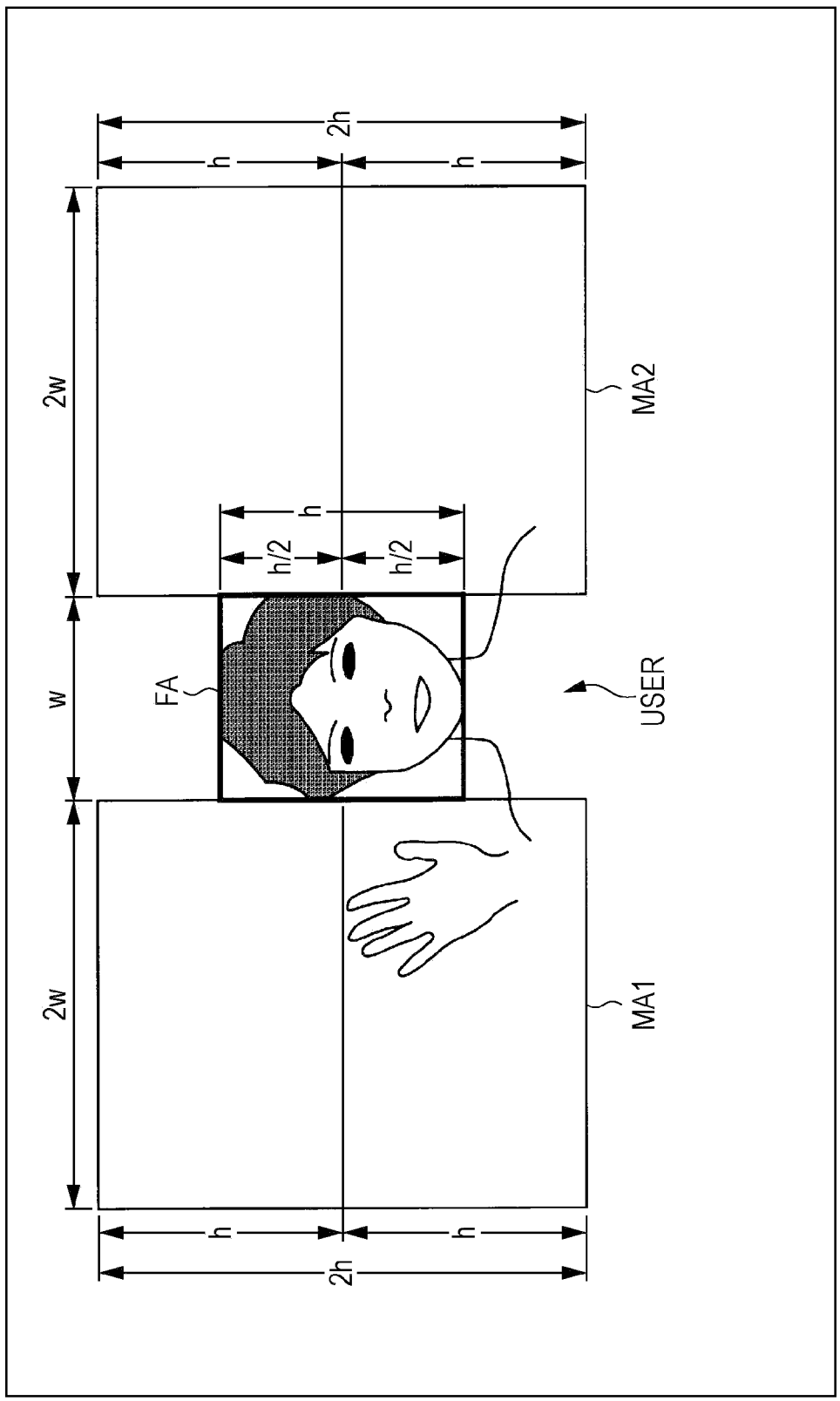
FIG. 3 is an explanatory diagram illustrating an example of action region setting processing with the information processing device according to an embodiment of the present disclosure.

Also, as shown in FIG. 1 for example, the information processing device 100 identifies a region greater than the face and including the detected face, but the face region identifying method at the information processing device 100 is not restricted to the above. For example, the information processing device 100 may identify the smallest region of the region including the detected face (e.g., a region closely containing the detected face such as shown in FIG. 3), as the face region.

The information processing device 100 identifies the face region as described above, for example. Now, the imaged image which the information processing device 100 processes is a moving image, there can be cases where the position in the imaged image of the face region identified in a certain frame changes in the next frame. Accordingly, the information processing device 100 performs face region detection processing for each frame, for example. Note that the frequency of performing face region detection processing according to an embodiment of the present disclosure is not restricted to the above, and the information processing device 100 may perform face region detection processing every predetermined frame, or every predetermined time, for example.

(2) Action Region Setting Processing

Upon the face region being detected in the above processing of (1) (face region detection processing), the information processing device 100 sets action regions nearby the face region, based on the face region.

Figure 2:
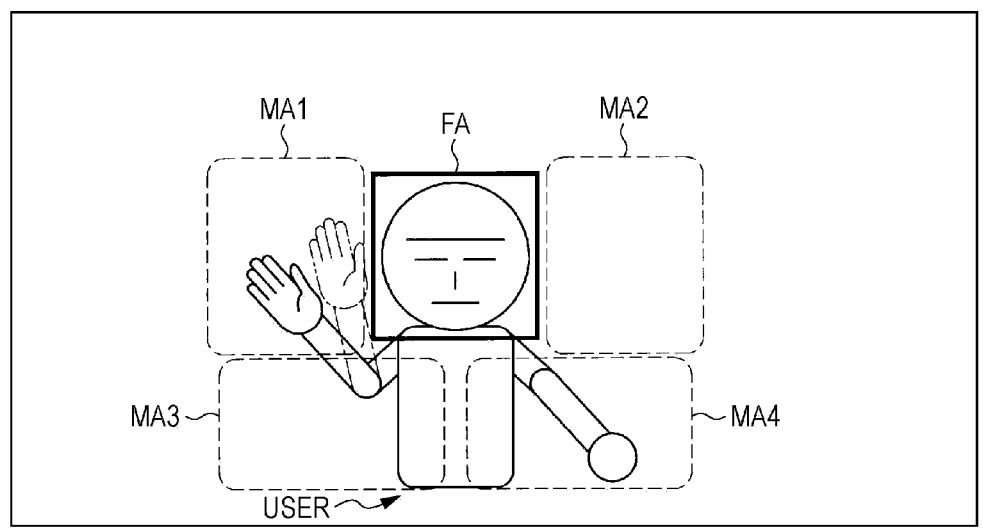
FIG. 2 is an explanatory diagram illustrating an example of action regions which the information processing device according to an embodiment of the present disclosure sets.

FIGS. 1 and 2 are explanatory diagrams illustrating an example of the action regions which the information processing device 100 according to an embodiment of the present disclosure sets. FA in FIGS. 1 and 2 denotes the face region of the user which the information processing device 100 has detected, and MA1 and MA2 in FIG. 1, and MA1 through MA4 in FIG. 2, illustrate an example of the action region which the information processing device 100 has set. Hereinafter, the face region may be referred to as "face region FA", and the action regions may be collectively referred to as "action region MA". Now, the face region FA and action region MA shown in FIGS. 1 and 2 have been illustrated for sake of convenience of description, and in the event the imaged image is to be displayed on a display screen of an external device such as a display device 300 for example, or on a display screen of a display unit (later described) which the information processing device 100 has, the face region FA and action region MA do not have to be explicitly shown (this holds true throughout the following description). It goes without saying that the information processing device 100 according to an embodiment of the present disclosure may display an imaged image in which the face region FA and action region MA are explicitly shown on the display screen.

Now, while FIG. 1 illustrates an example where the information processing device 100 has set circular action regions, the action regions MA set by the information processing device 100 according to an embodiment of the present disclosure are not restricted to the example shown in FIG. 1. For example, the information processing device 100 may set action regions of various shapes, such as rectangular action regions as those shown in FIG. 2, elliptical action regions, and so forth. Also, while FIG. 1 shows a case where the information processing device 100 has set action regions MA nearby the left side of the face region FA and nearby the right side of the face region FA, the action regions MA which the information processing device 100 according to an embodiment of the present disclosure sets are not restricted to the above-described. For example, the information processing device 100 may set an action region MA to one of nearby the left side of the face region FA or the nearby the right side of the face region FA. Also, as shown in FIG. 2 for example, the information processing device 100 may further set one or multiple action regions MA to nearby below the face region FA. Also, the information processing device 100 may set one or multiple action regions MA to one of nearby below the face region FA or nearby above the face region FA, or to both nearby below the face region FA and nearby above the face region FA. It goes without saying that the action regions MA which the information processing device 100 sets near the face region are not restricted to the above-described.

By setting action regions MA such as shown in FIGS. 1 and 2, the information processing device 100 does not detect an action performed outside of an action region MA, such as indicated by A in FIG. 1 for example, as a predetermined action. Accordingly, the information processing device 100 can reduce the probability of erroneously detecting a predetermined action more than with a information processing device according to the related art which takes the entire imaged image as the object of processing.

Also, by setting multiple action regions MA nearby the face region FA as shown in FIG. 2 for example, the information processing device 100 can detect predetermined actions in each of the multiple action regions MA, and perform processing for each action region MA corresponding to the detected predetermined actions, for example.

Now, in the event of increasing the number of action regions MA to be set as shown in FIG. 2, for example, the calculation load is greater than the case shown in FIG. 1, but in comparison with a information processing device according to the related art which performs image processing on the entire imaged image, the calculation load is markedly reduced. Accordingly, event in the event of increasing the number of action regions MA to be set as shown in FIG. 2 for example, there is no concern of insufficient calculation resources as with information processing device according to the related arts, so there is no deterioration in user convenience.

Also, by performing processing corresponding to a predetermined action for each action region MA as described above, the information processing device 100 can perform processing different for each detected action region MA even in the event that the user has performed the same predetermined action, for example. That is to say, the information processing device 100 can appropriate multiple processing for one predetermined action. It goes without saying that the processing which the information processing device 100 performs in the event that one predetermined action is detected at each of the multiple action regions MA may be the same.

Further, by performing processing corresponding to predetermined operations for each action region MA as described above, the information processing device 100 can perform processing correlated with the meaning of the detected action (processing taking affordance into consideration), coupled with the position where the predetermined action was detected (more specifically, in which region it was detected). Accordingly, the information processing device 100 can further improve user operability.

Specific Example of Action Region Setting Processing

Now, an example of action region setting processing with the information processing device 100 will be described in further detail. FIG. 3 is an explanatory diagram for describing an example of action region setting processing at the information processing device 100 according to an embodiment of the present disclosure. Now, FIG. 3 illustrates an example of processing in a case of setting action regions MA to nearby the left side and nearby the right side of the face region FA, as shown in FIG. 1.

The information processing device 100 sets action regions MA based on the width (length in horizontal direction) w and height (length in vertical direction) h of the identified face region FA. Now, FIG. 3 illustrates an example where the information processing device 100 has set rectangular action regions MA1 and MA2 with a width of 2w and a height of 2h. Note that the information processing device 100 can also set the action regions MA so as to be ellipses where 2w and 2h are the minor axis and major axis, for example (a circle when w=h).

Also, the information processing device 100 sets the action regions MA so as to come into contact with the identified face region FA as shown in FIG. 3 for example, but the setting method of the action regions MA by the information processing device 100 is not restricted to the above-described. For example, the information processing device 100 may set the action regions MA at positions distanced from the identified face region FA by a predetermined number of pixels. That is to say, to "set an action region nearby a face region" according to an embodiment of the present disclosure includes setting an action region MA in contact with a face region FA and setting an action region MA at a position in close proximity to a face region FA.

As described above, for example, the information processing device 100 sets the action regions MA based on the width w and height h of the identified face region FA.

Note that the setting processing of action regions MA with the information processing device 100 according to an embodiment of the present disclosure is not restricted to the above-described. For example, the information processing device 100 may perform face recognition processing on the image within the face region FA in the imaged image to estimate user attributes such as age and gender and the like of the user with regard to this face region FA, and adjust the region size and position of the action regions MA, based on the estimation results. By adjusting the region size and position of the action regions MA based on the estimation results as described above, action regions MA can be set corresponding to the age and gender of the user, such as setting the position of the action regions MA shown in FIG. 2 so as to be lower for aged users, for example. Note that while the information processing device 100 estimates user attributes by extracting attribute information such as structure, wrinkles, sagging skin, and so forth for example, from the face region FA and analyzing this, the method for estimating user attributes according to an embodiment of the present disclosure is not restricted to the above-described. For example, the information processing device 100 may estimate user attributes using optional techniques capable of estimating user attributes such as age and gender and the like of the user corresponding to the face region FA.

Also, the information processing device 100 can extract face information indicating features of the face of the user by performing face recognition processing to the image in the face region FA, and adjust the action regions MA by identifying the user corresponding to the face region FA based on the extracted face information. More specifically, in the event that the user has been identified based on the face information, the information processing device 100 sets action regions MA for the identified user. An example of information relating to setting of action regions MA for the user include a database where face information and information relating to adjustment of the action regions MA is recorded. Also, information relating to setting of the action regions MA of the user may be included in later-described individual detection information. The information processing device 100 can obtain face information indicating the features of the face of the user that has been extracted, but extracting facial features of the user (e.g., structure information, information indicating the positional relation of eyes, nose, and mouth, and so forth) by performing image processing of the face region FA, for example. Also, the information processing device 100 obtains information relating to adjustment of the action regions MA, such as adjustment amount of region size of the action regions MA, position adjustment amount of action regions MA, and so forth, based on user operations, for example. Note that the information relating to adjustment of action regions MA may include information indicating the number of action regions MA set. By setting action regions MA for users as described above, the action regions MA which the users themselves can adjust can be set, so the information processing device 100 can further increase the freedom of the user, and improve convenience.

By performing processing such as described above for example, the information processing device 100 sets action regions MA nearby the face region FA based on the face region FA. Now, as described above, the imaged image which the information processing device 100 processes is a moving image, so the position of the face region in the imaged image identified in a certain frame may change in the next frame. The information processing device 100 performs setting of the action regions MA based on the face region FA each time a face region FA is identified by the processing of (1) above, but the action region setting processing by the information processing device 100 according to an embodiment of the present disclosure is not restricted to the above-described. For example, the information processing device 100 may detect the amount of movement of the face region FA in the current frame as to the face region FA in the previous frame, and in the event that the amount of movement is equal to or smaller than a predetermined threshold (or smaller than the threshold), sets the action region MA set in the previous frame so as to be moved to corresponding to the amount of movement. It goes without saying that the face region FA in the previous frame is not restricted to one frame back from the current frame (for example, in the event that the processing of (1) is to be performed every predetermined frame, the frame before the predetermined frame is the previous frame).

(3) Action Determination Processing

Upon action regions MA being set in the processing of (2) above (action region setting processing), the information processing device 100 determines that a predetermined action has been performed by the user in an action region MA, based on the imaged image, and the reference detection information or individual detection information.

Now, reference detection information according to an embodiment of the present disclosure is data serving as a reference of detection of predetermined actions of the user (object of detection). Here, the information processing device 100 stores the reference detection information beforehand by this being recorded in the information processing device 100 at the time of manufacturing by the manufacturer of the information processing device 100, but the information processing device 100 is not restricted to a configuration of storing reference detection information beforehand. For example, the information processing device 100 may obtain reference detection information generated by an external device such as a server or the like, from the external device. Examples of reference detection information include data and databases where predetermined actions and periodic component information for detecting periodic actions are correlated. Also, examples of periodic component information according to an embodiment of the present disclosure include information of frequency of change in brightness in the imaged image, but periodic component information according to an embodiment of the present disclosure is not restricted to the above. Note that reference detection information according to an embodiment of the present disclosure is not restricted to the above, and may be data and databases where predetermined actions, and information for distinguishing gestures of the user which are not periodic actions (e.g., data for determining that the shape of the hand of the user is a predetermined shape), are correlated. Hereinafter, description will be made with reference to an example where reference detection information is a data base in which predetermined actions and periodic component information are correlated for each predetermined action and recorded. Note that while examples of the database according to an embodiment of the present disclosure include relational databases, the database according to an embodiment of the present disclosure is not restricted to the above.

Also, individual detection information according to an embodiment of the present disclosure is data to serve as a reference for detection of predetermined actions which a particular user performs. The individual detection information is generated and updated by a learning unit (later described), for example. Note that the individual detection information according to an embodiment of the present disclosure may be generated by an external device such as a server, with the information processing device 100 obtaining the individual detection information from the external device. Now, examples of individual detection information include predetermined actions, data and databases where periodic component information for detecting periodic actions of the user, and face information indicating facial features of the user (information for identifying the user), are correlated. Note that the individual detection information according to an embodiment of the present disclosure is not restricted to the above-described, and may be data and databases where predetermined actions, information for distinguishing gestures of the user which are not periodic actions, and facial information, are correlated. Hereinafter, description will be made with reference to an example where the individual detection information is a database where predetermined actions, periodic component information, and facial information, are correlated for each predetermined action, and recorded.

(3-1) First Example of Action Determination Processing

Processing based on reference detection information will be described as a first example of action determination processing according to an embodiment of the present disclosure. The information processing device 100 detects a periodic component in an action region MA set based on the imaged image. The information processing device 100 then determines whether or not a predetermined action has been performed, based on the detection results at the action region MA and periodic component information of the reference detection information. Now, the information processing device 100 determines whether or not a predetermined action has been performed by analyzing properties of a specific point (specific pixel) within the action region MA, using the Fischer's method or the like for example, but the determination method according to an embodiment of the present disclosure is not restricted to the above. Also, while the information processing device 100 detects the periodic components in the action region MA using imaged images every predetermined time or imaged images in increments of a predetermined number of frames, for example, the detection method for periodic components in the action region MA according to an embodiment of the present disclosure is not restricted to the above-described.

(3-2) Second Example of Action Determination Processing

Next, processing selectively using reference detection information or individual detection information will be described as a second example of action determination processing according to an embodiment of the present disclosure. The information processing device 100 extracts face information from the face region FA identified by the processing of (1) above. Also, the information processing device 100 determines whether or not there is face information corresponding to the face information extracted from the individual detection information, based on the extracted face information and individual detection information. Now, in the event that the face information according to an embodiment of the present disclosure is a group of multiple information, such as information of the structure and information indicating the positional relation of the eyes, nose, and mouth, for example, the information processing device 100 determines that there is face information corresponding to the extracted face information in the event that there is face information matching the extracted face information in the individual detection information. Note that the determination method regarding whether or not there is face information corresponding to the extracted face information in the individual detection information performed at the information processing device 100 according to an embodiment of the present disclosure, is not restricted to the above-described. For example, the information processing device 100 may determine that there is face information corresponding to the extracted face information in the event that there is face information matching face information regarding which a predetermined number or greater of the group of multiple information has been extracted.

In the event of having determined that there is individual detection information corresponding to the extracted face information, the information processing device 100 determines whether or not a predetermined action correlated with the periodic component information has been made, based on the detection results of the periodic component in the action region MA, and the periodic component information included in the individual detection information.

Also, in the event that determination is not made that there is individual detection information corresponding to the extracted face information, the information processing device 100 determines whether or not a predetermined action has been performed, based on the detection results and periodic component information of the reference detection information, in the same way as with the first example of action determination processing described above.

As described above for example, the information processing device 100 determines that a predetermined action has been performed by the user in an action region MA, based on the imaged image and reference detection information or individual detection information, as described above for example. Note that the action determination processing at the information processing device 100 according to an embodiment of the present disclosure is not restricted to the above. For example, in the event of performing determination using information for distinguishing gestures of the user which are not periodic components, for example, the information processing device 100 can determine that a predetermined action has been performed by the user in an action region MA, based on whether or not the shape of the hand of the user in the action region MA is a predetermined shape stipulated in information for distinguishing the gestures in the reference detection information or individual detection information.

Also, in the event that determination is made that a predetermined action has been performed, the information processing device 100 can also update the individual detection information (so-called learning). More specifically, in the event that determination is made that a predetermined action has been performed, the information processing device 100 takes periodic component information detected based on the imaged image, for example, as periodic component information in the individual detection information corresponding to the determined predetermined action and the face information extracted from the imaged image. Also, in the event that determination is made that a predetermined action has been performed, the information processing device 100 may take information representing the shape of the hand of the user that has been detected (i.e., information of the position of joints, etc.,), for example, as information for distinguishing the gestures in the individual detection information. By updating the individual detection information as described above, the information processing device 100 can further improve the determination precision of predetermined actions of a particular user of which predetermined actions are determined from individual detection information, and thus further reduce the possibility or erroneous determination.

Now, the information processing device 100 performs the above-described processing relating to updating of individual detection information each time determination is made that a predetermined action has been performed (processing relating to learning), for example, but processing at the information processing device 100 is not restricted to the above. For example, the information processing device 100 can selectively perform processing relating to updating of the individual detection information (processing relating to learning), based on user operations.

Also, in the event of determining whether or not a predetermined action has been performed using periodic component information, the information processing device 100 determines whether or not a predetermined action has been performed each time a periodic component is detected in an action region MA for example, but the action determination processing according to an embodiment of the present disclosure is not restricted to the above. For example, the information processing device 100 may detect whether or not there is a moving body in an action region MA set based on the imaged image every predetermined time or imaged images in increments of a predetermined number of frames, and selectively determine that a predetermined action has been performed in the event that a moving body is detected. Now, in the event that no moving body is detected in an action region MA when determining whether or not a predetermined action has been performed using periodic component information, the probability that the user has not performed an action in action region MA is high. Accordingly, by selectively detecting whether or not a predetermined action has been performed in the event that a moving body is detected as described above, the information processing device 100 can reduce calculation load on the information processing device 100 while preventing missed detection of predetermined actions of the user and erroneous detection.

(4) Execution Processing

Upon determination being made that a predetermined action has been performed in the processing of (3) above (action determination processing), the information processing device 100 performs processing corresponding to the determined predetermined action.

More specifically, the information processing device 100 stores processing information in which the predetermined action and processing to be executed have been recorded in a correlated manner for example, and performs processing correlated with the determined predetermined action in the processing of (3) above, based on the processing results of (3) above and the processing information. Note that the processing information according to an embodiment of the present disclosure is not restricted to the above-described. For example, the information processing device 100 may store processing information in which information indicating an action region MA (e.g., region No. or the like), predetermined action, and processing to be executed, recorded in a correlated manner. In the case described above, the information processing device 100 can perform processing corresponding to a predetermined action for each action region MA regarding which determination has been made that a predetermined action has been performed. Also, the processing information according to an embodiment of the present disclosure may be, for example, data for each predetermined action, or may be a database in which is recorded information relating to multiple predetermined actions.

Also, while an example of processing corresponding to a predetermined action which the information processing device 100 performs includes processing relating to functions which the device itself has, the processing corresponding to the predetermined actions which the information processing device 100 according to an embodiment of the present disclosure performs is not restricted to the above. For example, as processing corresponding to a predetermined action, the information processing device 100 may transmit a processing execution command for causing an external device to perform processing corresponding to a predetermined action, via a network (or directly) to the external device. Thus, the information processing device 100 can cause the external device to perform processing corresponding predetermined actions of the user.

The information processing device 100 performs processing of (1) (face region detection processing) through processing of (4) (execution processing) described above for example, thereby determining that the user has performed a predetermined action, and performing processing corresponding to the determined predetermined action.

Now, the information processing device 100 sets action regions MA nearby the face region FA identified based on the imaged image, detects (determines) predetermined actions of the user in the set action regions MA, and performs processing corresponding to the detected predetermined actions. By setting the action regions MA in this way, the information processing device 100 can detect actions of the user by performing image processing on a part of the regions in the imaged image, rather than performing image processing on the entire imaged image as with information processing device according to the related arts. Thus, the information processing device 100 can reduce the calculation burden relating to detection of predetermined actions of the user as compared to information processing device according to the related arts, so with the information processing device 100, so occurrence of undesirable situations which can happen with information processing device according to the related arts described above can be prevented. Accordingly, the information processing device 100 can prevent deterioration in user convenience which can occur in the case of using the related art, and also can improve user operability.

Specific Example of Processing Relating to Operability Improvement Approaches

Figure 4:
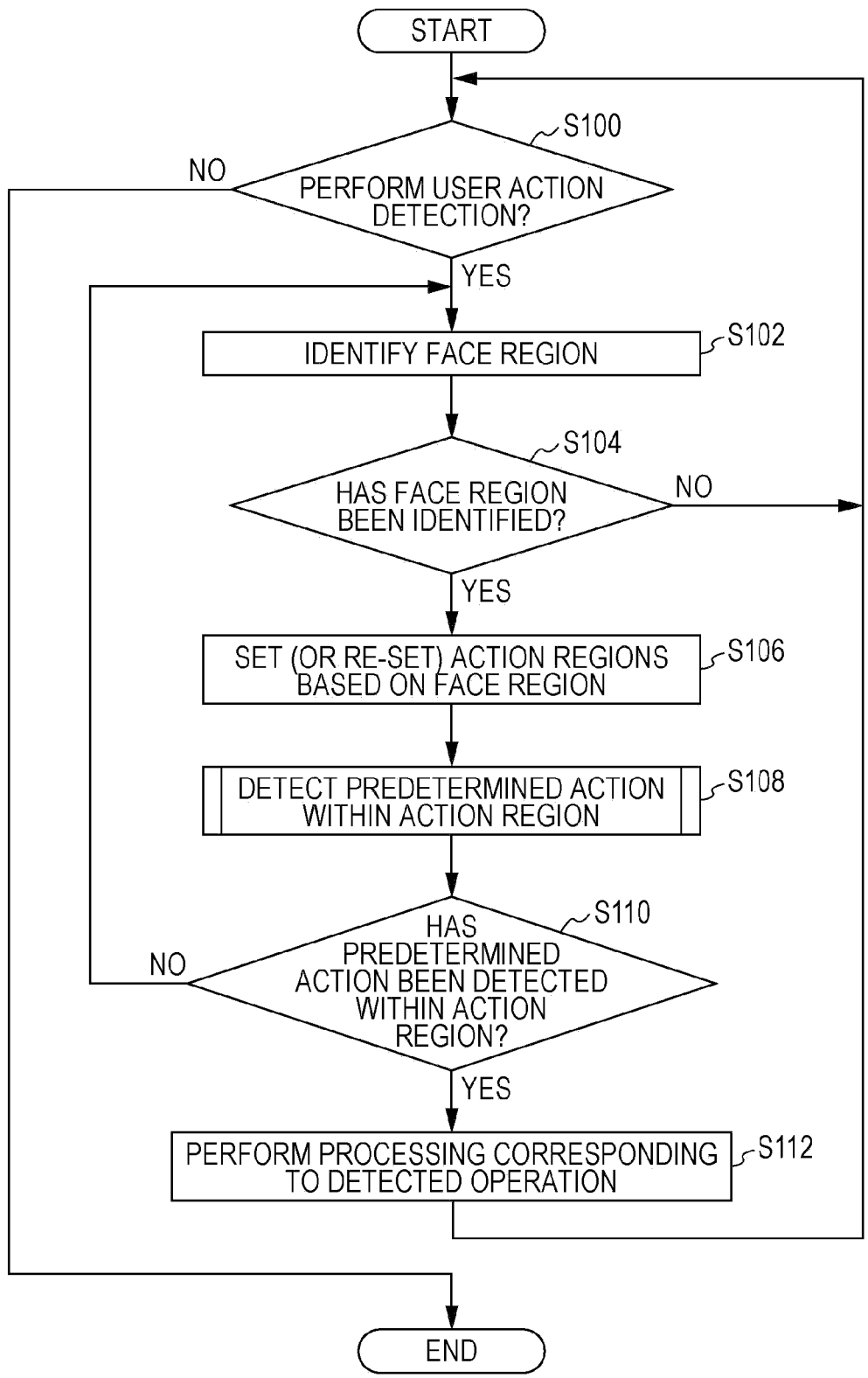
FIG. 4 is a flowchart illustrating an example of processing relating to an operability improvement approach with the information processing device according to an embodiment of the present disclosure.

Next, description will be made regarding an example of processing to realize the operability improvement approach according to an embodiment of the present disclosure described above. FIG. 4 is a flowchart illustrating an example of processing for realizing the operability improvement according to an embodiment of the present disclosure described above. Hereinafter, description will be made with reference to an example of processing in a case of the information processing device 100 determining a predetermined action made by a user, based on periodic components in an action region MA set as to the imaged image.

The information processing device 100 determines whether or not to perform action detection of the user (S100). Now, in a case there have been provided functions for selectively switching between a first processing mode where the information processing device 100 performs action detection and a second processing mode where action detection is not performed for example, based on user operations and the like, the processing in step S100 is equivalent to determination of whether or not the processing mode is the first processing mode. That is to say, in the event that the information processing device 100 does not have a function for switching between the first processing mode and the second processing mode, the information processing device 100 does not have to perform the processing of step S100.

In the event that determination is not made to perform action detection of the user in step S100, the information processing device 100 ends the processing relating to the operability improvement approach. Note that the processing relating to the operability improvement approach in FIG. 4 is not processing of a type which is not performed again once it is ended, rather, the information processing device 100 can periodically/non-periodically repeat the processing relating to the operability improvement approach shown in FIG. 4 even though the processing ends for the time being.

Also, in the event that determination is made to perform action detection of the user in step S100, the information processing device 100 performs face detection based on the input imaged image, and identifies a face region FA (S102). Now, the processing in step S102 corresponds to the processing of (1) above (face region detection processing). Also, the information processing device 100 identifies the face region FA by detecting feature points such as, for example, the user's eyes, nose, mouth, structure, and so forth, and detecting regions similar to the face brightness distribution and structure pattern; however, the method for identifying the face region FA is not restricted to the above-described.

Also, in the event that multiple face regions FA are identified from the imaged image, such as cases where there are multiple users in the imaged image, the information processing device 100 performs the processing of the later-described steps S104 through S112, for each of the identified multiple face regions FA.

Upon performing the processing of step S102, the information processing device 100 determines whether or not a face region FA has been identified (S104). In the event that determination is not made that a face region FA has been identified in step S104, the information processing device 100 repeats the processing from step S100.

Also, in the event that determination is made that a face region FA has been identified in step S104, the information processing device 100 sets action regions MA based on the face region FA (S106). Now, the processing in step S106 corresponds to the processing of (2) above (action region setting processing). Also, the information processing device 100 sets the action regions MA nearby the face region FA as shown in FIGS. 1 and 2 for example, but the action regions MA set by the information processing device 100 are not restricted to the examples shown in FIGS. 1 and 2.

Upon action regions MA being set (or re-set) in step S106, the information processing device 100 detects predetermined actions in the set action regions MA (S108). The information processing device 100 then determines whether or not a predetermined action has been detected within the set action regions MA (S110). Here, the processing of steps S108 and S110 corresponds to the processing of (3) above (action determination processing).

More specifically, in step S108 the information processing device 100 detects whether or not a predetermined action has been performed, based on detection results of periodic components in the action regions MA set based on the imaged image, and periodic component information of reference detection information, for example (equivalent to first example of action determination processing described above). Now, the reference detection information is stored in a storage unit (described later) which the information processing device 100 has, for example, with the information processing device 100 reading out the reference detection information from this storage unit to perform the above-described detection, but the processing at the information processing device 100 according to an embodiment of the present disclosure is not restricted to the above-described. For example, the information processing device 100 may perform communication with an external device such as a server storing reference detection information, and obtain reference detection information from the external devices, so as to perform the detection using the obtained reference detection information.

Note that the processing of step S108 at the information processing device 100 according to an embodiment of the present disclosure is not restricted to processing using reference detection information. For example, the information processing device 100 may perform processing using reference detection information or individual detection information as the processing of step S108, as illustrated in the second example of the action determination processing described above.

Figure 5:
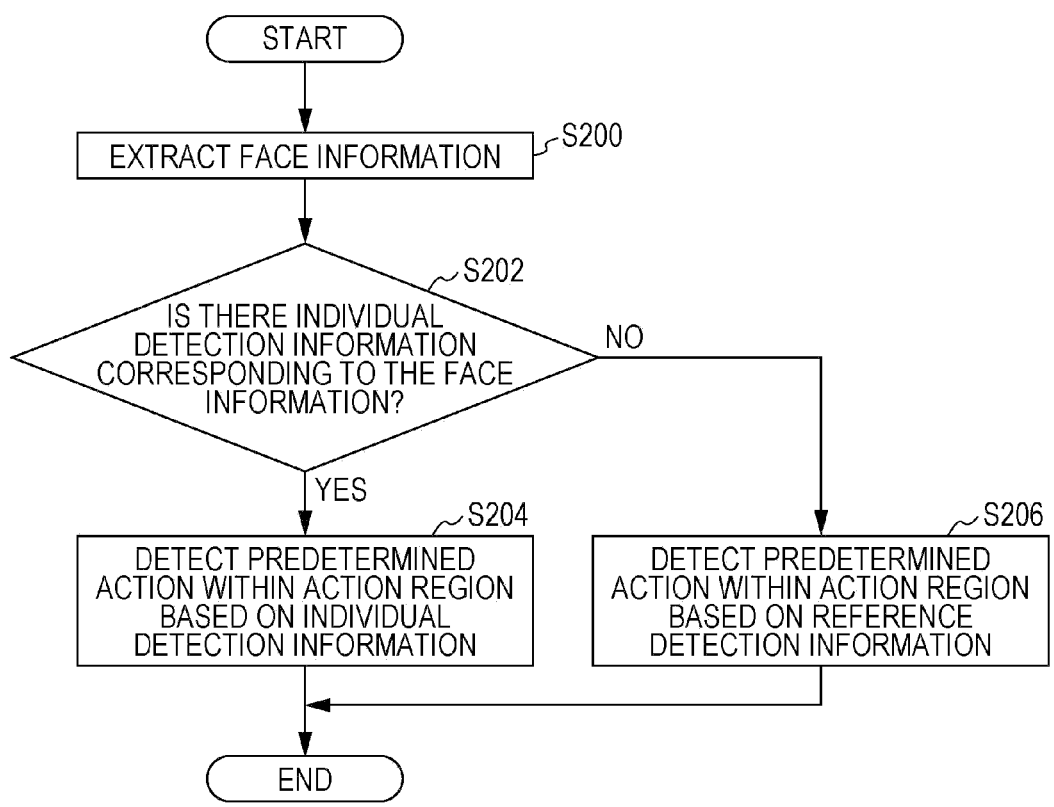
FIG. 5 is a flowchart illustrating an example of action determination processing with the information processing device according to an embodiment of the present disclosure.

FIG. 5 is a flowchart illustrating an example of action determination processing at the information processing device 100 according to an embodiment of the present disclosure. Here, FIG. 5 illustrates an example of processing equivalent to the second example of the action determination processing described above.

The information processing device 100 extracts face information from the face region FA (S200). The information processing device 100 then determines whether or not there is face information in the individual detection information that corresponds to the extracted face information (S202).

Now, the individual detection information is stored in a storage unit (described later) which the information processing device 100 has, for example, with the information processing device 100 reading out the individual detection information from this storage unit and performing the above-described determination processing, but the processing at the information processing device 100 according to an embodiment of the present disclosure is not restricted to the above-described. For example, the information processing device 100 may perform communication with an external device such as a server storing individual detection information, and obtain individual detection information from the external devices, so as to perform the detection using the obtained individual detection information. Also, the information processing device 100 may transmit the face information extracted in step S200 to an external device storing the individual detection information so as to cause the external device to perform actual determination regarding whether or not there is face information in the individual detection information corresponding to the extracted face information, and obtain the determination results from the external device. In the above case as well, the information processing device 100 can perform the processing of step S202 based upon the determination results obtained from the external device.

In the event that determination is made in step S202 that there is face information in the individual detection information corresponding to the extracted face information, the information processing device 100 detects that a predetermined action has been performed, based on the detection results of periodic components in the action region MA set based on the imaged image, and periodic component information of the individual detection information in which is included the face information corresponding to the extracted face information.

Also, in the event that determination is not made in step S202 that there is face information in the individual detection information corresponding to the extracted face information, the information processing device 100 detects that a predetermined action has been performed, based on the detection results of periodic components in the action region MA set based on the imaged image, and periodic component information of the reference detection information.

By performing the processing shown in FIG. 5 for example, the information processing device 100 can detect that a predetermined action has been performed using the reference detection information or individual detection information.

Also, by the information processing device 100 detecting that a predetermined action has been performed using the individual detection information, the information processing device 100 can prevent erroneous detection or excessive detection of predetermined actions of users corresponding to the face information included in the individual detection information.

Figure 6:
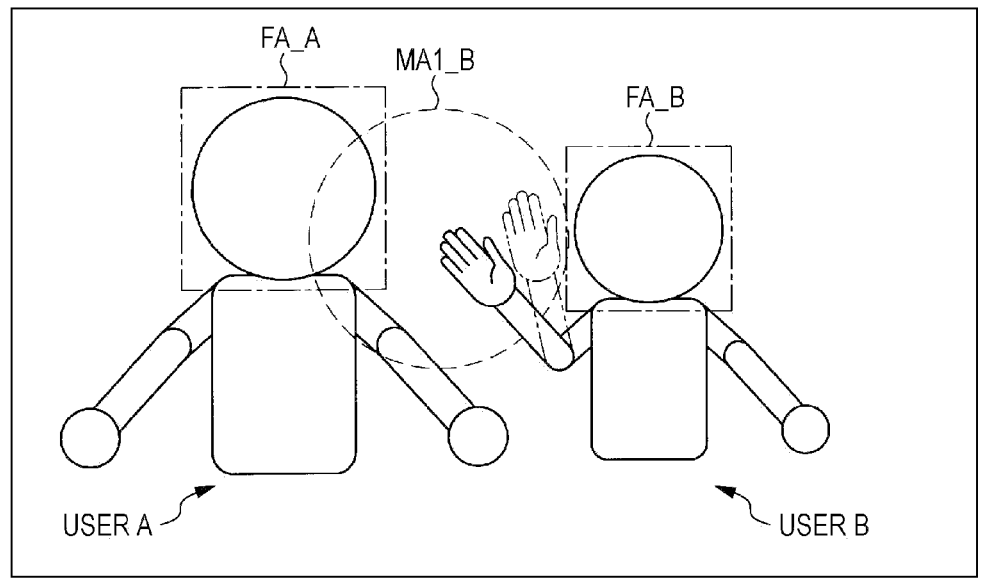
FIG. 6 is an explanatory diagram for describing advantages of detecting that a predetermined action has been performed using individual detection information, by the information processing device according to an embodiment of the present disclosure.
Figure 7:
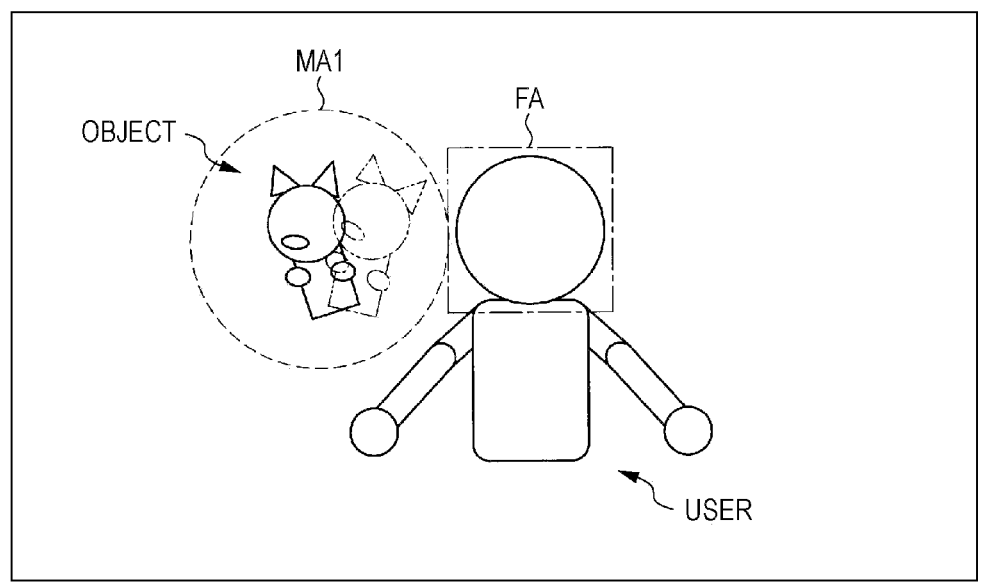
FIG. 7 is an explanatory diagram for describing advantages of detecting that a predetermined action has been performed using individual detection information, by the information processing device according to an embodiment of the present disclosure.

FIGS. 6 and 7 are explanatory diagrams for describing advantages of the information processing device 100 according to an embodiment of the present disclosure detecting that a predetermined action has been performed using individual detection information.

In the event that there are a user A and user B in an imaged image such as shown in FIG. 6, part or all of the action regions MA of each user may overlap action regions MA of the other user. In this case, in the event that one user (the user B in FIG. 6) has performed a bye-bye action in overlapping action regions MA, which user has performed this action may not be able to be detected unequivocally. Now, in the event of performing determination using the individual detection information, the information processing device 100 can unequivocally determine whether the action which has been performed is an action of the user A or an action of the user B. Accordingly, even in cases that there are the user A and user B in an imaged image such as shown in FIG. 6, the information processing device 100 can prevent erroneous detection or excessive detection of predetermined actions of users corresponding to the face information included in the individual detection information, by detecting that a predetermined action has been performed using the individual detection information.

Also, by performing determination using individual detection information, the information processing device 100 detects predetermined actions with a detection reference unique to the user, so as shown in FIG. 7, even in the event that a periodic action is performed within a set action region MA by an object which is not the user, the information processing device 100 can prevent erroneous detection or excessive detection of predetermined actions of users better than a case of using reference detection information.

Referring to FIG. 4 again, an example of processing relating to the operability improvement approaches at the information processing device 100 according to an embodiment of the present disclosure will be described. Upon the processing of step S108 being performed, the information processing device 100 determines whether or not a predetermined action has been detected in the set action regions MA (S110). In the event that determination is not made that a predetermined action has been detected in the set action regions MA in step S110, the information processing device 100 repeats the processing from step S102.

Also, in the event that determination is made in step S110 that a predetermined action has been detected in a set action region MA the information processing device 100 performs processing corresponding to the detected action (S112). Here, the processing of step S112 corresponds to the processing of (4) above (execution processing).

By performing the processing shown in FIG. 4 for example, the information processing device 100 can realize the processing of (1) (face region detection processing) through the processing of (4) (Execution processing) described above, relating to the operability improvement approach. Accordingly, the information processing device 100 can improve user operability by performing the processing shown in FIG. 4, for example. It goes without saying that the processing relating to the operability improvement approach according to an embodiment of the present disclosure is not restricted to the processing shown in FIG. 4.

2. Information Processing Device According to Embodiment of Present Disclosure

Next, an example will be described of the configuration of an information processing device 100 according to an embodiment of the present disclosure, that is capable of performing processing relating to the operability improvement approaches according to an embodiment of the present disclosure described above.

First Embodiment

Figure 8:
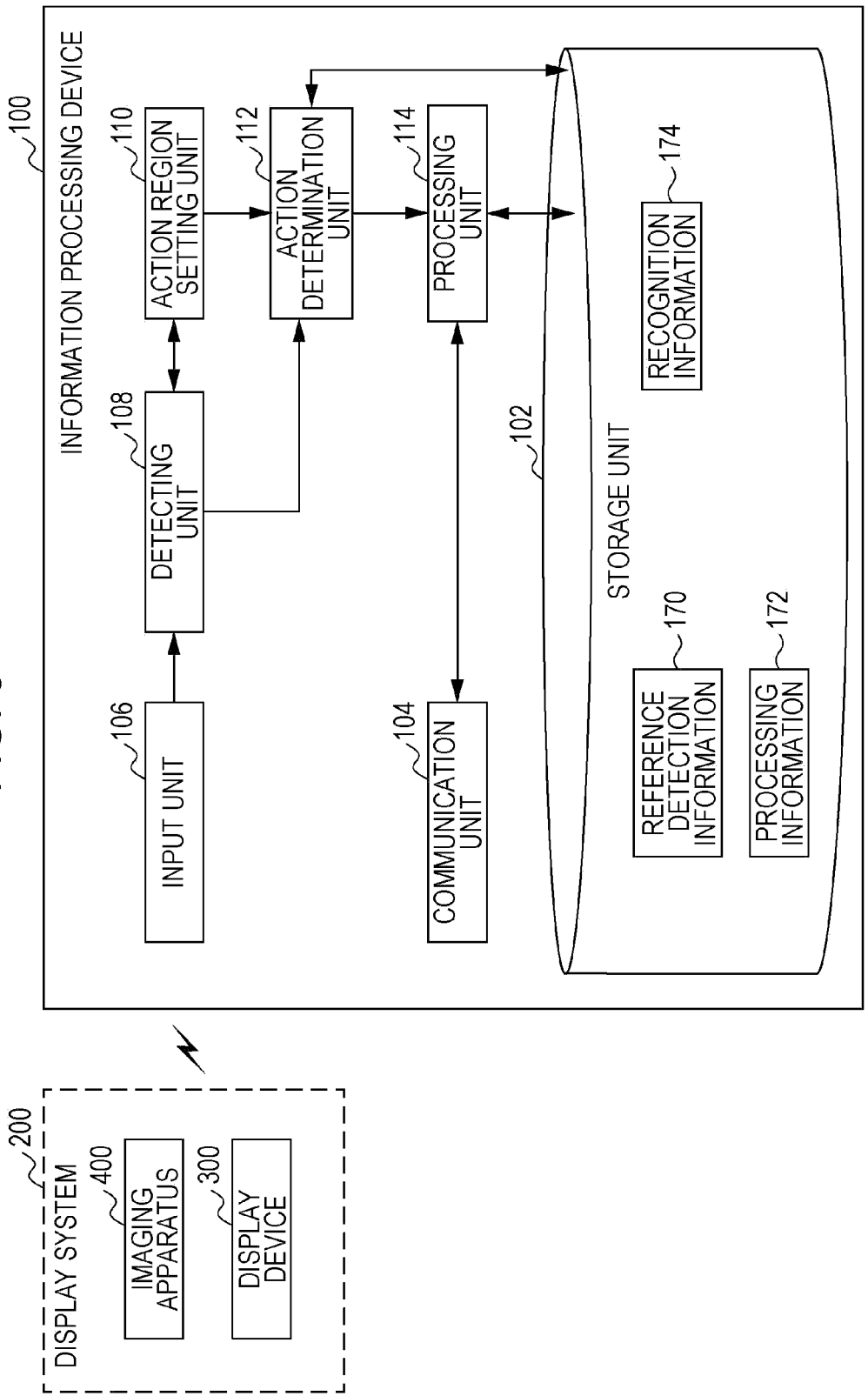
FIG. 8 is a block diagram illustrating an example of the configuration of an information processing device according to a first embodiment of the present disclosure.

FIG. 8 is a block diagram illustrating an example of the configuration of an information processing device 100 according to a first embodiment of the present disclosure. Now, FIG. 8 shows as well a display system 200 which performs display of an image (still image or moving image) on a display screen, and generating of imaged images by imaging in the display direction of the display screen. Here, while FIG. 8 shows an example where the display system 200 is made up of a display device 300 which performs display and an imaging apparatus 400 which performs imaging, the configuration of the display system 200 according to an embodiment of the present disclosure is not restricted to the above-described. For example, the display system 200 may be a device wherein the display device 300 and the imaging apparatus 400 have been integrated (e.g., a display device having imaging functions).

Now, an imaged image which has imaged the user viewing the display screen is obtained by the display system 200 generating an imaged image taking images in the direction of display of the display screen. Accordingly, by the information processing device 100 processing the imaged image generated by the display system 200, the information processing device 100 can easily perform processing such as identifying face regions FA and setting action regions MA, detection of predetermined actions of the user, extraction of facial expressions, and so forth.

With reference to FIG. 8, the information processing device 100 has a storage unit 102, a communication unit 104, an input unit 106, a detecting unit 108, an action region setting unit 110, an action determination unit 112, and processing unit 114.

The information processing device 100 may further have a control unit (not shown), ROM (Read Only Memory (not shown)), RAM (Random Access Memory (not shown)), and so forth, for example. The information processing device 100 has the components interconnected by a bus serving as a data transfer path, for example. Here, the control unit (not shown) serves to control the entire information processing device 100. Note that with the information processing device 100, the processing unit 114 may serve as the control unit (not shown), for example. Also, ROM (not shown) stores programs which the control unit (not shown) uses, and data for processing such as computation parameters and so forth, for example. The RAM (not shown) temporarily stores data and programs executed by the control unit (not shown) for example.

Hardware Configuration Example of Information Processing Device 100

Figure 9:
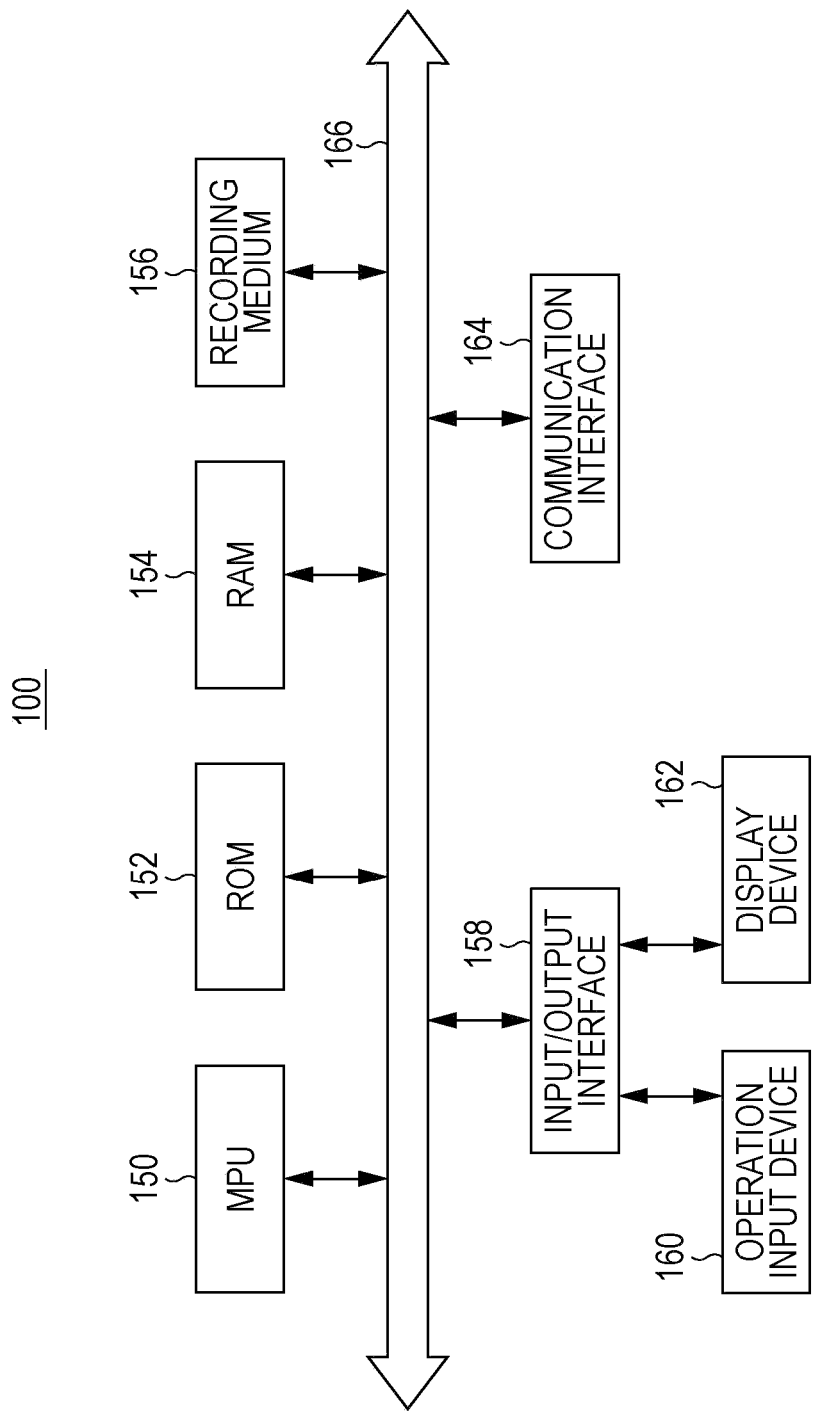
FIG. 9 is an explanatory diagram illustrating an example of the hardware configuration of an information processing device according to an embodiment of the present disclosure.

FIG. 9 is an explanatory diagram illustrating an example of the hardware configuration of an information processing device 100 according to an embodiment of the present disclosure. With reference to FIG. 9, the information processing device 100 includes, for example, an MPU (Micro Processing Unit) 150, ROM 152, RAM 154, a recording medium 156, an input/output interface 158, an operation input device 160, a display device 162, and a communication interface 164. Also, the information processing device 100 has the components interconnected with a bus 166 serving as a data transfer path, for example.

The MPU 150 is an integrated circuit where multiple circuits for realizing various types of functions such as image processing and the like are integrated, and so forth, and functions as a control unit (not shown) controlling the entire information processing device 100. Also, the MPU 150 serves as the detecting unit 108, action region setting unit 110, and action determination unit 112, and processing unit 114. Also, the MPU 150 may serve as a later-described learning unit.

The ROM 152 control data such as stores programs and computation parameters and the like which the MPU 150 uses. The RAM 154 temporarily stores the programs and the like to be executed by the MPU 150, for example.

The recording medium 156 functions as the storage unit 102, and stores various data such as reference detection information, individual detection information, processing information, and so forth (or databases), applications, and so forth, for example. Examples of the recording medium 156 include magnetic storage media such as hard disks or the like, and nonvolatile memory such as EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory). Also, the information processing device 100 may have a recording medium 156 which is detachable from the information processing device 100.

Also, the input/output interface 158 connects the operation input device 160 and display device 162, for example. Also, the input/output interface 158 can serve as the input unit 106. The operation input device 160 serves as an operating unit (not shown), and the display device 162 serves as a display unit (later-described). Now, examples of the input/output interface 158 include a USB (Universal Serial Bus) terminal, DVI (Digital Visual Interface) terminal, HDMI (High-Definition Multimedia Interface) terminal, various types of processing circuits, and so forth. Also, the operation input device 160 is provided on the information processing device 100 for example, and is connected with the input/output interface 158 inside the information processing device 100. Examples of the operation input device 160 include buttons, direction keys, rotating selectors such as jog dials, combinations thereof, and so forth. Also, the display device 162 is provided on the information processing device 100 for example, and is connected with the input/output interface 158 inside the information processing device 100. Examples of the display device 162 include LCDs (Liquid Crystal Display) and organic ElectroLuminescence displays (also called OLED (Organic Light Emitting Diode) displays). It goes without saying that the input/output interface 158 can be connected external devices serving as external devices of the information processing device 100, such as an operation input device (e.g., keyboard, mouse), display device (e.g., external display device such as display device 300), imaging device (e.g., imaging apparatus 400 and so forth) and the like. Also, the display device 162 may be a device capable of display and user operations, such as a touch screen for example.

The communication interface 164 which the information processing device 100 has functions as the communication unit 104 for performing communication by wireless/cable with external devices such as the display device 300, a server (not shown), and so forth for example, via the network 400 (or directly). Examples of the communication interface 164 include a communication antenna and RF circuit (wireless communication), IEEE 802.15.1 port and transmission/reception circuit (wireless communication), IEEE 802.11b port and transmission/reception circuit (wireless communication), or LAN terminal and transmission/reception circuit (cable communication), and so forth.

The information processing device 100 performs processing relating to the operability improvement approaches according to an embodiment of the present disclosure, with the configuration shown in FIG. 9, for example. Note that the hardware configuration of the information processing device 100 according to an embodiment of the present disclosure is not restricted to the configuration shown in FIG. 9.

For example, the information processing device 100 may have an audio output device configured of a DSP (Digital Signal Processor) and an amplifier (amp) and speakers and the like, serving as an audio output unit (later described). In the case of the above-described, the information processing device 100 can perform muting of audio and volume adjustment for example, as processing corresponding to predetermined actions of the user.

Also, the information processing device 100 may have an imaging device configured of a lens/imaging device and signal processing circuit, serving as an imaging unit (later described), for example. In the case of the above-described, the information processing device 100 can process imaged images which it has generated itself. Now, the lens/imaging device is configured of an optical lens, and an image sensor using multiple imaging devices such as CCD (Charge Coupled Device) or CMOS (Complementary Metal Oxide Semiconductor) or the like, for example. The signal processing unit has, for example, an AGC (Automatic Gain Control) circuit or ADC (Analog to Digital Converter), converts analog signals generated by the imaging device into digital signals (image data), and performs various types of signal processing. Examples of signal processing which the signal processing circuit performs include white balance correction processing, interpolation processing, color correction processing, gamma correction processing, YCbCr conversion processing, edge enhancement processing, coding processing, and so forth.

Also, the information processing device 100 may be of a configuration not having the operation input device 160 or display device 162 shown in FIG. 9, for example.

Returning to FIG. 8, a first example of the configuration of the information processing device 100 according to an embodiment of the present disclosure will be described. The storage unit 102 is storage which the information processing device 100 has. Now, examples of the storage unit 102 include magnetic recording media such as hard disks or the like, and nonvolatile memory such as flash memory or the like.

Also, the storage unit 102 stores various data such as reference detection information, individual detection information, processing information, and so forth (or databases), applications, and so forth, for example. FIG. 8 illustrates an example where reference detection information 170, processing information 172, and recognition information 174 are stored in the storage unit 102. Now, the recognition information according to an embodiment of the present disclosure is information relating to a user, detected from an imaged image. Examples of the recognition information include the number of users included in the imaged image, expressions representing the feature of the user, information indicating the emotion of a user that has been estimated, presence or absence of body motions, and so forth, which is data obtained by the information processing device 100 analyzing the imaged image.

The communication unit 104 which the information processing device 114 has performs communication by wireless/cable with external devices such as the display device 300, a server (not shown), and so forth for example, via the network (or directly). Also, the communication unit 104 has communication thereof controlled by a control unit (not shown) and the processing unit 114, for example. Examples of the communication unit 104 here include a communication antenna and RF, circuit LAN terminal and transmission/reception circuit, and so forth, but the communication unit 104 is not restricted to the above-described. For example, the communication unit 104 may have an optional configuration so as to be communicable with an external device via the network.

The input unit 106 receives the imaged image which the imaging apparatus 400 has generated by imaging. The input unit 106 then hands the received (input) imaged image to the detecting unit 108. Now, examples of the input unit 106 include a USB terminal, DVI terminal, HDMI terminal, various processing circuits, and so forth, but the input unit 106 is not restricted to the above-described. For example, the input unit 106 may have an optional configuration so as to be capable of receiving imaged images from an eternal device by cable or wirelessly.

Note that the input unit 106 is not restricted to receiving imaged images, and may receive data generated by a distance sensor or the like provided to the display device 300 (e.g., distance data indicating the distance between the display screen and the user), for example. In the event hat the above data is received, the input unit 106 hands the data to the processing unit 114. In the above-described case, the information processing device 100 can perform processing corresponding to predetermined actions further based on distance data and the like handed at the later-described processing unit 114.

The detecting unit 108 has a leading role in the processing of (1) above (face region detection processing). More specifically, the detecting unit 108 detects the face region FA including the face of the user from an imaged image for example, and hands the information indicating the detected (identified) face region FA and the imaged image to the action region setting unit 110.

Also, the detecting unit 108 may further detect a moving body in the set action regions MA with the action region setting unit 110, and inform the action determination unit 112 whether or not a moving body has been detected. In the above case, the action determination unit 112 can selectively perform later-described processing in the event that a moving body has been detected. Accordingly, with the information processing device 100, reduction of the calculation load at the information processing device 100, and prevention of non-detection or erroneous detection predetermined actions of users, can be realized.

The action region setting unit 110 has a leading role in the processing of (2) above (action region setting processing). More specifically, in the event that a face region FA is detected at the detecting unit 108 for example, the action region setting unit 110 sets action regions MA nearby the face region FA, based on the face region FA. The action region setting unit 110 then hands the information of the set action regions MA to the detecting unit 108 and the action determination unit 112, for example. Also, the action region setting unit 110 hands the imaged image handed from the detecting unit 108, to the action determination unit 112. Note that in the event that the configuration is such that the input unit 106 and detecting unit 108 hand the imaged image to the action determination unit 112, the action region setting unit 110 does not have to hand the imaged image to the action determination unit 112.

Also, the action region setting unit 110 can extract face information indicating the features of the face of the user from the face region FA, and re-set the action regions MA set based on the face region FA based on face information (i.e., adjust the action regions MA).

The action determination unit 112 has a leading role in the processing of (3) above (action determination processing). More specifically, the action determination unit 112 determines that a predetermined action has been performed by the user in an action region MA which the action region setting unit 110 has set, based on the imaged image and reference detection information 170. In the event of determining that a predetermined action has been performed, for example, the action determination unit 112 hands determination results indicating that a predetermined action has been performed to the processing unit 114. Now, the action region setting unit 110 detects periodic components in the action regions MA and determines that a predetermined action has been performed based on the detection results of the periodic component in the action region MA and the periodic component information in the reference detection information 170, for example, but the processing at the action region setting unit 110 is not restricted to the above-described.

Though not shown in FIG. 8, in the event that individual detection information is stored in the storage unit 102, or in the event that processing is performed collaboratively with an external device such as a server storing individual detection information, the action determination unit 112 can selectively use the reference detection information 170 or individual detection information to determine that a predetermined action has been performed by the user in an action region MA.

Also, in the event of detecting periodic component in an action region MA and determining that a predetermined action has been performed, the action determination unit 112 does not have to detect periodic component other than in the action region MA. Due to the above-described, the information processing device 100 can further reduce the load (calculation load) of processing relating to the operability improvement approaches according to an embodiment of the present disclosure.

The processing unit 114 has a leading role in the processing of (4) above (execution processing). More specifically, upon determination being made at the action determination unit 112 that a predetermined action has been performed, the processing unit 114 performs processing corresponding to the predetermined action determined at the action determination unit 112, based on the processing information 172, for example. Now, predetermined actions and processing to be executed for example, are recorded in the processing information 172 in a correlated manner. Accordingly, by using the processing information 172 in which processing correlated with the meaning of the predetermined action has been recorded, the information processing device 100 can perform processing correlated to the meaning of the detected action (processing taking affordance into consideration).

Also, the processing unit 114 can transmit a processing execution command to cause an external device to perform processing corresponding to the predetermined action via the communication unit 104, as processing corresponding to the predetermined action. Accordingly, the information processing device 100 can cause the display device 300 which is an external device, or the like, to perform processing corresponding to the detected predetermined action.

Also, the processing unit 114 may perform processing such as recording recognition information in the storage unit 102, transmitting the recognition information 174 stored at the storage unit 102 to an external device such as a server (not shown) via the communication unit 104, and so forth, for example.

With the configuration shown in FIG. 8, the information processing device 100 according to the first embodiment can realize the processing of (1) (face region detection processing) through the processing of (4) (execution processing) described above according to the second operability improvement approach. Accordingly, the information processing device 100 can improve user operability by the configuration shown in FIG. 8 for example.

Modification of Information Processing Device 100 According to First Embodiment

Note that the configuration of the information processing device 100 according to the first embodiment of the present disclosure is not restricted to the configuration shown in FIG. 8. For example, the information processing device 100 according to the first embodiment may further have a device for realizing processing correlated with the meaning of a predetermined action performed by the user, such as an audio output device or the like. Also, the information processing device 100 according to the first embodiment may be arranged not having the storage unit 102 but rather obtaining information used for processing such as the reference detection information 170 and processing information 172 from an external device as appropriate, so as to perform processing.

Second Embodiment

Figure 10:
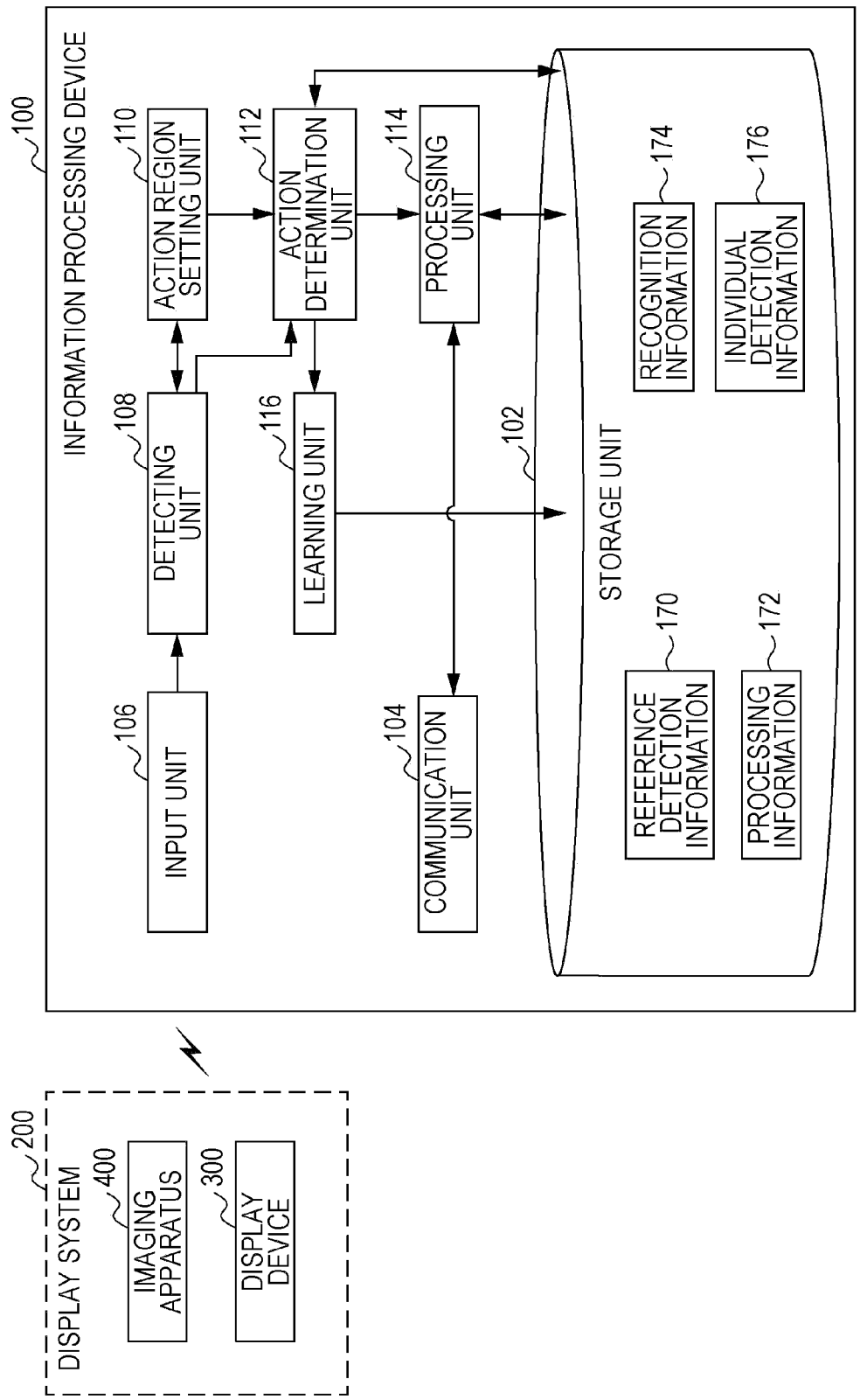
FIG. 10 is a block diagram illustrating an example of the configuration of an information processing device according to a second embodiment of the present disclosure.

FIG. 10 is a block diagram illustrating an example of the configuration of an information processing device according to a second embodiment of the present disclosure. In FIG. 10, the display system 200 is shown together, as with FIG. 8.

The information processing device 100 according to the second embodiment shown in FIG. 10 has basically the same configuration as the information processing device 100 according to the first embodiment shown in FIG. 8, but the information processing device 100 according to the second embodiment further is provided with a learning unit 116 as compared to the information processing device 100 according to the first embodiment shown in FIG. 8.

The learning unit 116 serves to manage individual detection information. For example, in the event of determination being made at the action determination unit 112 that a predetermined action has been performed, the learning unit 116 updates the individual detection information corresponding to the determined predetermined action and the face information extracted form the action region setting unit 110. More specifically, the learning unit 116 takes the information of the periodic component detected at the action determination unit 112, for example, as periodic component information in the individual detection information corresponding to the determined predetermined action and the face information extracted by the action region setting unit 110. Note that in the event that the detecting unit 108 has a function for detecting periodic components in the action regions MA, the learning unit 116 may take the periodic component information handed from the detecting unit 108 as periodic component information in the individual detection information.

Now, in the event that determination is made at the action determination unit 112 that a predetermined action has been performed, the learning unit 116 can automatically update the individual detection information, but the processing at the learning unit 116 is not restricted to the above-described. For example, the learning unit 116 can selectively update individual detection information based on operating signals corresponding to user operations that are sent from an operating unit (not shown) or external operating signals transmitted from an external operating device such as a remote controller or the like.

Note that the management of individual detection information at the learning unit 116 is not restricted to updating periodic component information in the individual detection information described above. For example, the learning unit 116 can manage information unique to the user, such as information relating to adjustment of region size of the action regions MA and adjustment of position thereof, information of the period for determining the predetermined action of the user, and so forth, as individual detection information. Also, the learning unit 116 can generate or update individual detection information based on operating signals sent from an operating unit (not shown) in accordance with user operations by way of a user interface for learning for example, regardless of the determination results from the action determination unit 112.

The information processing device 100 according to the second embodiment has basically the same configuration as the information processing device 100 according to the first embodiment shown in FIG. 8. Accordingly, the information processing device 100 according to the second embodiment can realize the processing of (1) (face region detection processing) through the processing of (4) (execution processing) described above, according to the operability improvement approach with the configuration shown in FIG. 10, in the same way as with the information processing device 100 according to the first embodiment. Accordingly, the information processing device 100 according to the second embodiment can improve user operability with the configuration shown in FIG. 10, for example.

Also, by having the learning unit 116, the information processing device 100 according to the second embodiment can manage information according to unique conditions of the user, such as for example, age, gender, physical features, and so forth, as individual detection information. Now, as described with reference to FIGS. 6 and 7, the information processing device 100 prevents erroneous detection and excessive detection of actions of a particular user corresponding to the face information included in the individual detection information, by detecting that a predetermined action has been performed using individual detection information. Accordingly, due to the learning unit 116 managing individual detection information, the information processing device 100 can improve the precision of determination in the event of determining actions of a particular user corresponding to individual detection information.

Modification of Information Processing Device 100 According to Second Embodiment Note that the configuration of the information processing device 100 according to the second embodiment of the present disclosure is not restricted to the configuration shown in FIG. 10. For example, the information processing device 100 according to the second embodiment may further have a device for realizing processing correlated with the meaning of a predetermined action performed by the user, and so forth, as with the case of the modification of the information processing device 100 according to the first embodiment. Also, the information processing device 100 according to the second embodiment may obtain information used for processing such as the reference detection information 170 and processing information 172 from an external device such as a server as appropriate, so as to perform processing, in the same way as with the information processing device 100 according to the first embodiment.

Third Embodiment

In the above description, a configuration has been illustrated as an information processing device 100 according to the first embodiment and an information processing device 100 according to the second embodiment, with the imaging apparatus 400 (e.g., external device) of the display system 200 processing generated imaged images. However, the configuration of the information processing device 100 according to an embodiment of the present disclosure is not restricted to a configuration where an external device processes generated imaged images.

Figure 11:
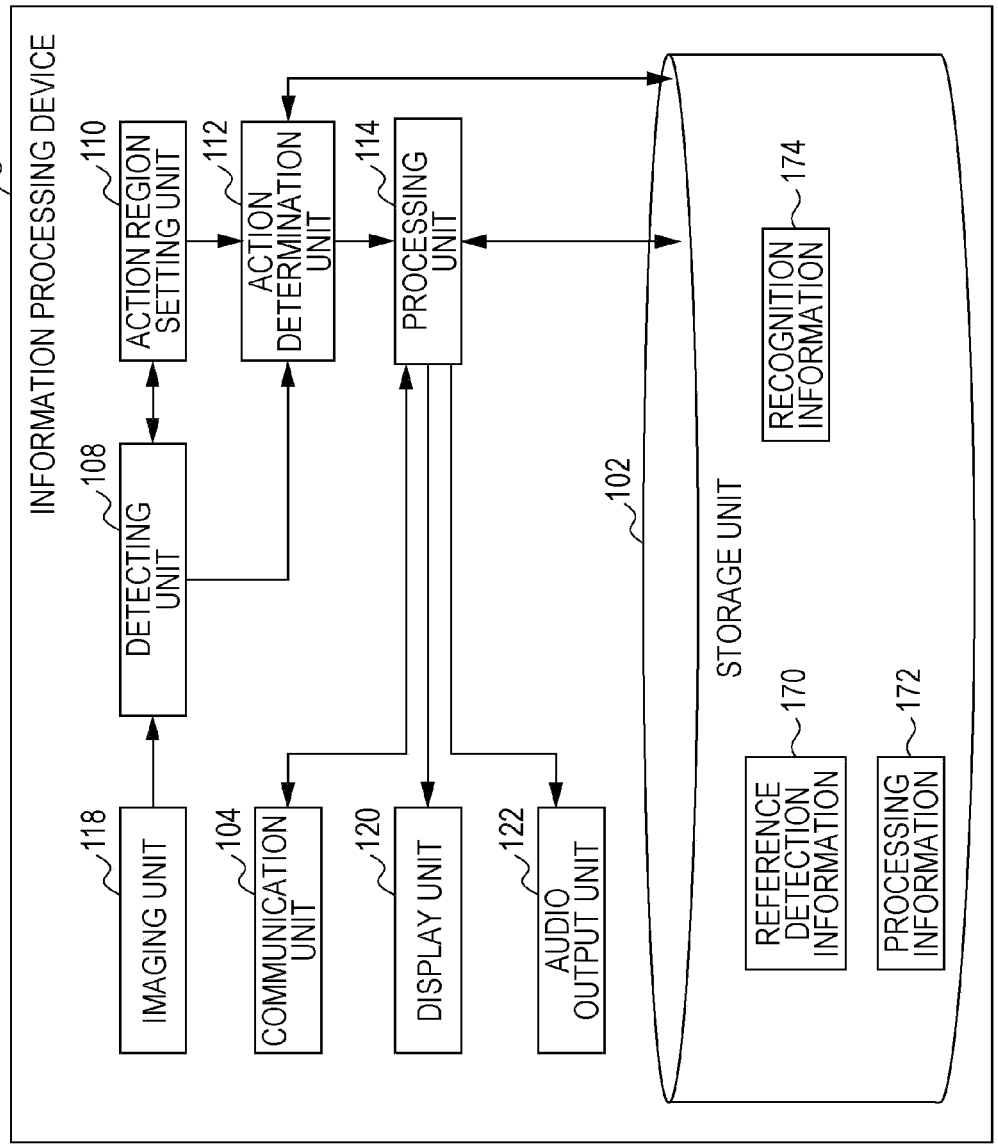
FIG. 11 is a block diagram illustrating an example of the configuration of an information processing device according to a third embodiment of the present disclosure.

FIG. 11 is a block diagram illustrating an example of the configuration of an information processing device 100 according to a third embodiment of the present disclosure.

The information processing device 100 according to the third embodiment of the present disclosure shown in FIG. 11 has basically the same configuration as the information processing device 100 according to the first embodiment shown in FIG. 8, but the information processing device 100 according to the third embodiment further is provided with an imaging unit 118, a display unit 120, and an audio output unit 122 as compared to the information processing device 100 according to the first embodiment shown in FIG. 8.

The imaging unit 118 which the information processing device 100 has generates imaged images by imaging in the display direction of the display screen displayed on the display unit 120. The imaging unit 118 sends imaged images to the detecting unit 108. By the imaging unit 118 generating of imaged images by imaging in the display direction of the display screen, an imaged image imaging the user watching the display screen is obtained. Accordingly, the information processing device 100 can more easily perform the processing of (1) (face region detection processing) through (4) (execution processing) described above, such as identifying of the face region FA, setting of action regions MA, detection of predetermined actions of the user, extracting facial expressions, and so forth, for example.

Also, the imaging unit 118 is configured of one or two or more imaging devices configured of a lens/imaging device and signal processing circuit for example, but the configuration of the imaging unit 118 is not restricted to the above-described.

The display unit 120 which the information processing device 100 has displays various information and images on the display screen. Examples of screens displayed on the display screen of the display unit 120 include a content display screen for displaying contents, a screen for displaying imaged images generated by the imaging unit 118 (may be superimposed with contents), an operating screen for allowing desired actions to be performed as to the information processing device 100, and so forth.

The audio output unit 122 which the information processing device 100 has outputs various audio such as audio indicated by contents, or system audio at the information processing device 100, for example. By having the audio output unit 122, the information processing device 100 can perform muting of audio and volume adjustment of audio output from the audio output unit 122 for example, as processing corresponding to predetermined actions of the user which the processing unit 114 performs.

Also, examples of the audio output unit 122 include an audio output device configured of a DSP, and amplifier (amp) and speakers and the like, but the configuration of the audio output unit 122 is not restricted to the above-described.

The information processing device 100 according to the third embodiment of the present disclosure has basically the same configuration as the information processing device 100 according to the first embodiment shown in FIG. 8. Accordingly, the information processing device 100 according to the third embodiment can realize the processing of (1) (face region detection processing) through the processing of (4) (execution processing) described above relating to the second operability improvement approach with the configuration shown in FIG. 11, in the same way as the information processing device 100 according to the first embodiment. Accordingly, the information processing device 100 according to the third embodiment can improve user operability with the configuration shown in FIG. 11, for example.

Modification of Information Processing Device 100 According to Third Embodiment The configuration of the information processing device 100 according to the third embodiment of the present disclosure is not restricted to the configuration shown in FIG. 11. For example, the information processing device 100 according to the third embodiment may have the learning unit 116 in the same way as with the information processing device 100 according to the second embodiment. Also, the information processing device 100 according to the third embodiment may be of a configuration not having the audio output unit 122 for example, or may further have a device for realizing processing correlated to the meaning of predetermined actions of the user or the like. Further, the information processing device 100 according to the third embodiment may be of a configuration which obtains information used for processing such as reference detection information 170 and processing information 172 from an external device such as a server as appropriate, and performs processing, in the same way as with the modification of the information processing device 100 according to the first embodiment.

As described above, the information processing device 100 according to an embodiment of the present disclosure performs the processing of (1) (face region detection processing) through the processing of (4) (execution processing) described above for example, thereby determining that a predetermined action has been performed by the user, and performing processing corresponding to the determined predetermined action. Now, the information processing device 100 sets action regions MA nearby the face region FA identified based on the imaged image, detects (determines) predetermined actions of the user in the set action regions MA, and performs processing corresponding to the detected predetermined actions. By setting the action regions MA in this way, the information processing device 100 can detect actions of the user by performing image processing on a part of the regions in the imaged image, rather than performing image processing on the entire imaged image as with information processing device according to the related arts. Thus, the information processing device 100 can reduce the calculation burden relating to detection of predetermined actions of the user as compared to information processing device according to the related arts, so with the information processing device 100, so occurrence of undesirable situations which can happen with information processing device according to the related arts can be prevented. Accordingly, the information processing device 100 can prevent deterioration in user convenience can occur in the case of using the related art, and also can improve user operability.

Also, the information processing device 100 performs processing corresponding to a predetermined action detected in an action region MA set nearby the face region FA, so erroneous detection of predetermined actions performed by people or objects other than the user corresponding to the face region FA for example, can be reduced as compared to information processing device according to the related arts which take the entire imaged image and the object of processing. Accordingly, the information processing device 100 can further improve user operability than with information processing device according to the related arts.

The information processing device 100 further performs processing correlated with the meaning of the predetermined actions, as processing corresponding to the predetermined actions detected at the action regions MA set nearby the face region FA. As described above, due to the information processing device 100 performing processing correlated with the meaning of the detected actions (processing taking affordance into consideration), the chance that the user will sense inconsistency between the user's own actions and the processing which the information processing device 100 performs (or processing which the information processing device 100 causes an external device to perform) can be further reduced. Accordingly, the information processing device 100 can further improve user operability.

While description has been made with the information processing device 100 as an embodiment of the present disclosure, embodiments of the present disclosure are not restricted to this form. Embodiments of the present disclosure can be applied to various devices, such as for example, computers such as PCs and servers, display devices such as television receivers and signage devices, portable communication devices such as cellular phones, video/audio players (or video/audio recorder-players), game devices, and so forth.

Also, while description has been made with the display system 200 as an embodiment of the present disclosure, embodiments of the present disclosure are not restricted to this form. Embodiments of the present disclosure can be applied to various devices capable of displaying and imaging, such as for example, computers such as PCs, display devices such as television receivers and signage devices, portable communication devices such as cellular phones, and so forth. Note that the display system 200 according to an embodiment of the present disclosure may be a combination of a device which performs display and a device which performs imaging.

3. Program According Embodiment of Present Disclosure

User operability can be improved by a program for causing a computer to function as an information processing device according to an embodiment of the present disclosure (a program for realizing, for example, the processing of (1) (face region detection processing) through the processing of (4) (execution processing)).

While preferred embodiments of the present disclosure have been described with reference to the attached drawings, It goes without saying that the present disclosure is not restricted to these examples. It will be apparent to one skilled in the art that various alterations and modifications can be made within the scope of the Claims, which are encompassed by the technical scope of the present disclosure as a matter of course.

For example, in FIGS. 8, 10, and 11, an example has been shown where the information processing device 100 according to the first through third embodiments of the present disclosure (including modifications) separately have the detecting unit 108, action region setting unit 110, action determination unit 112, and processing unit 114, but the configuration of the information processing device according to an embodiment of the present disclosure is not restricted to the above-described. For example, the information processing device according to an embodiment of the present disclosure may have the detecting unit 108, action region setting unit 110, action determination unit 112, and processing unit 114, formed as a single component (e.g., realized with a single processing circuit). Also, the information processing device may have optional components integrated, such as for example, the detecting unit 108 and the action region setting unit 110 formed as a single component (e.g., an image processing unit realized with a single image processing circuit), and so forth. Further, the information processing device may separately have an information storage unit (not shown) for performing recording of recognition information, for example.

Also, while in the above description, an illustration has been made of a program for causing a computer to function as an information processing device according to an embodiment of the present disclosure (computer program) being provided, an embodiment of the present disclosure may further provide a storage medium in which the above-described program has been stored, therewith.

The above-described configurations are an illustration of an example of an embodiment of the present disclosure, and belong to the technical scope of the present disclosure, as a matter of course.

It should be understood by those skilled in the art that various modifications, combinations, sub-combinations and alterations may occur depending on design requirements and other factors insofar as they are within the scope of the appended claims or the equivalents thereof.

What is claimed is:

1. A processing device, comprising:
   a storage for storing detection information; and
   at least one processor for detecting a face region of a person in an image, estimating a number of predetermined attributes of the person, setting at least one action region according to a position of the face region and the estimated attribute or attributes, comparing image data corresponding to the at least one action region to the detection information for purposes of determining whether or not a predetermined action has been performed, and performing processing corresponding to the predetermined action when it is determined that the predetermined action has been performed,
   in which the number of predetermined attributes includes one or both of (i) an age of the person and/or (ii) a gender of the person.

2. A processing device as recited in claim 1, wherein the predetermined action corresponds to a periodic component of the image.

3. A processing device as recited in claim 2, wherein comparing image data corresponding to the at least one action region to the detection information comprises detecting whether or not the periodic component is present in the at least one action region and detecting whether or not the detection information correlates the periodic component to the predetermined action.

4. A processing device as recited in claim 1, wherein comparing image data corresponding to the at least one action region to the detection information for purposes of determining whether or not a predetermined action has been performed comprises extracting face information from the face region and determining whether or not there is individual detection information corresponding to the face information, and when there is individual detection information corresponding to the face information comparing image data corresponding to the at least one action region to the individual detection information for purposes of determining whether or not a predetermined action has been performed.

5. A processing device as recited in claim 4, wherein there is individual detection information and the individual detection information comprises one or more periodic components of the image.

6. A processing device as recited in claim 4, wherein there is individual detection information and the at least one processor updates the individual detection information in response to detection of a predetermined action.

7. A processing device as recited in claim 1, wherein determining whether or not a predetermined action has been performed comprises detecting whether or not there is a moving body in the at least one action region.

8. A processing device as recited in claim 1, wherein the at least one action region is rectangular, and the dimensions of the at least one action region are determined based on the height and width of the face region.

9. A processing device as recited in claim 1, wherein the device does not detect a predetermined action that occurs outside of the at least one action region.

10. A processing device as recited in claim 1, further comprising a communication unit for transmitting a processing execution command to an external apparatus.

11. A processing device as recited in claim 1, further comprising an imaging apparatus.

12. A processing device as recited in claim 1, further comprising a display device.

13. A processing device as recited in claim 1, wherein the predetermined action corresponds to a predetermined shape from within the image.

14. A processing device as recited in claim 1, wherein the storage stores at least reference detection information and individual detection information.

15. A processing device as recited in claim 1, wherein the at least one action region is elliptical.

16. A processing method, comprising:
    detecting a face region of a person in an image;
    estimating a number of predetermined attributes of the person,
    setting at least one action region according to a position of the face region and the estimated attribute or attributes;
    processing image data corresponding to the at least one action region to determine whether or not a predetermined action has been performed; and
    performing processing corresponding to the predetermined action when it is determined that the predetermined action has been performed,
    in which the number of predetermined attributes includes one or both of (i) an age of the person and/or (ii) a gender of the person.

17. A non-transitory computer-readable medium storing a computer-readable program for implementing a processing method, the processing method comprising:
    detecting a face region of a person in an image;
    estimating a number of predetermined attributes of the person,
    setting at least one action region according to a position of the face region and the estimated attribute or attributes;
    processing image data corresponding to the at least one action region to determine whether or not a predetermined action has been performed; and performing processing corresponding to the predetermined action when it is determined that the predetermined action has been performed,
in which the number of predetermined attributes includes one or both of (i) an age of the person and/or (ii) a gender of the person.

* * * * *